March 26, 1968   P. H. FOWLER ET AL   3,375,500
AUTOMATED ACCOUNTING SYSTEM
Filed Aug. 24, 1964   5 Sheets-Sheet 1
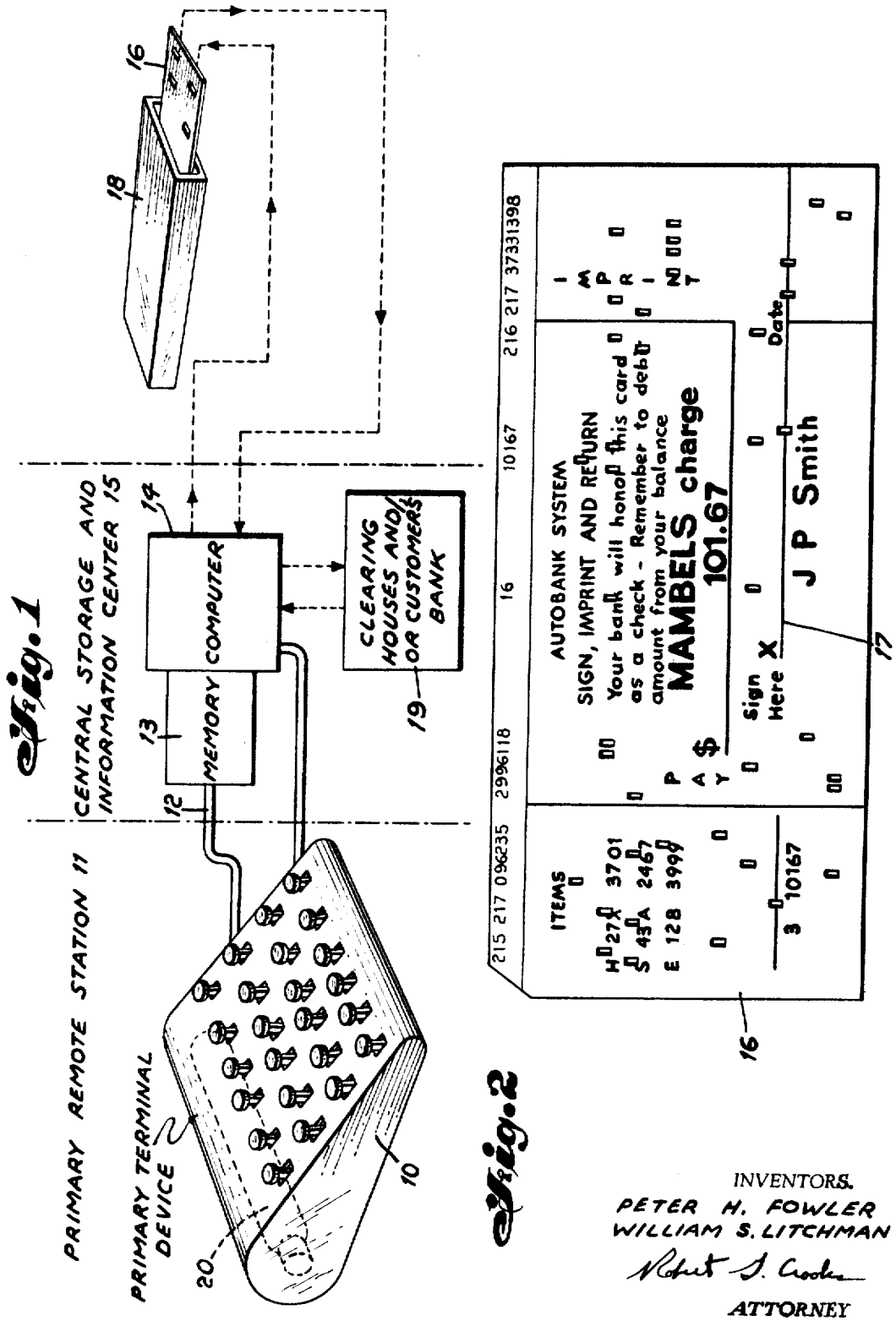
INVENTORS.
PETER H. FOWLER
WILLIAM S. LITCHMAN
Robert S. Crooks
ATTORNEY

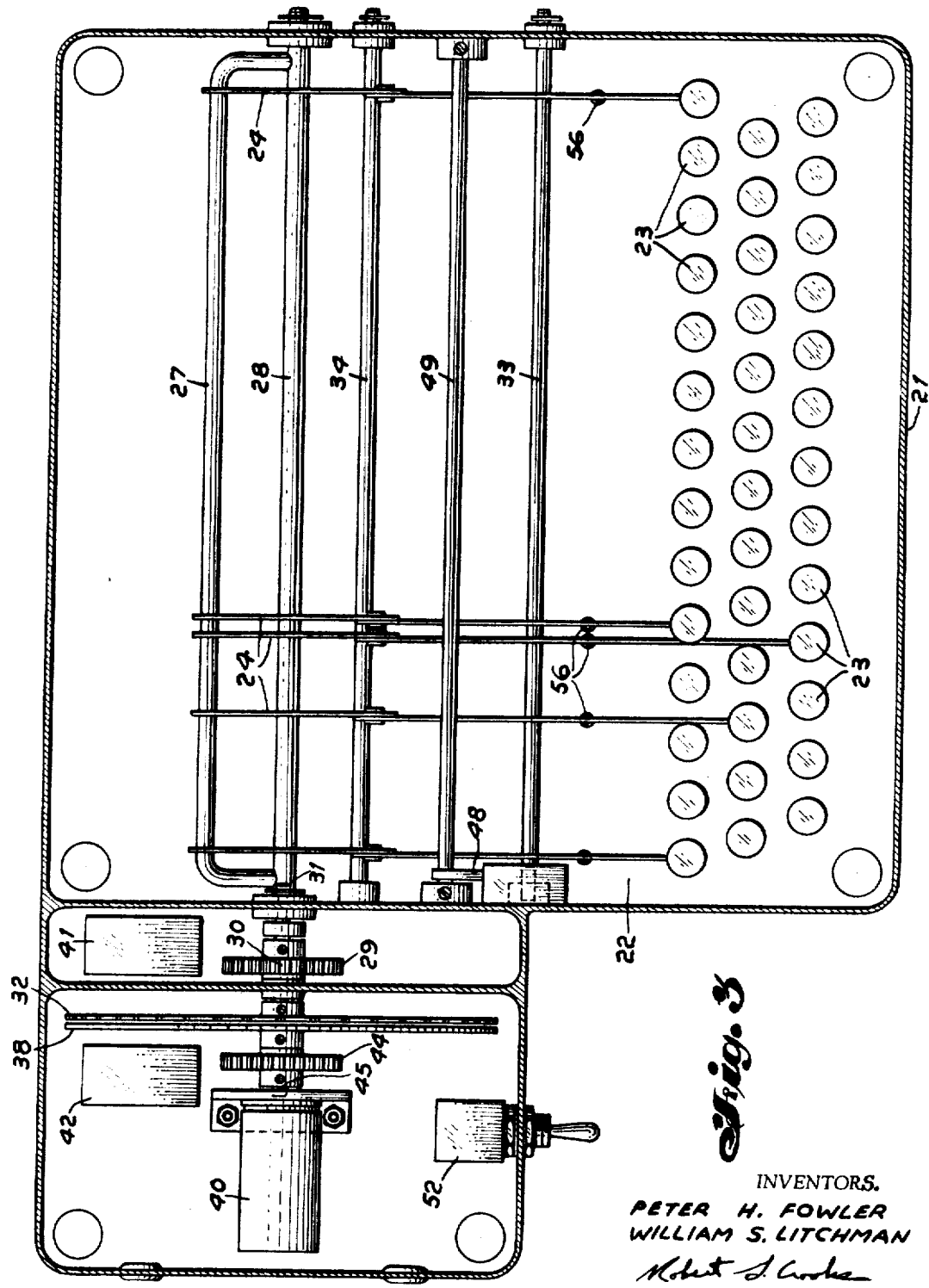

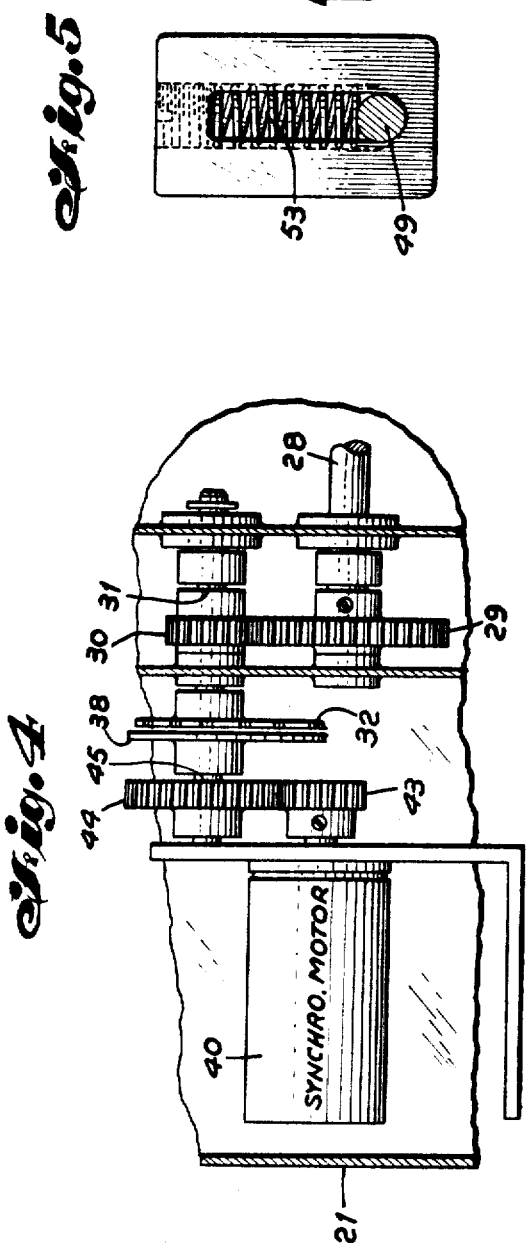
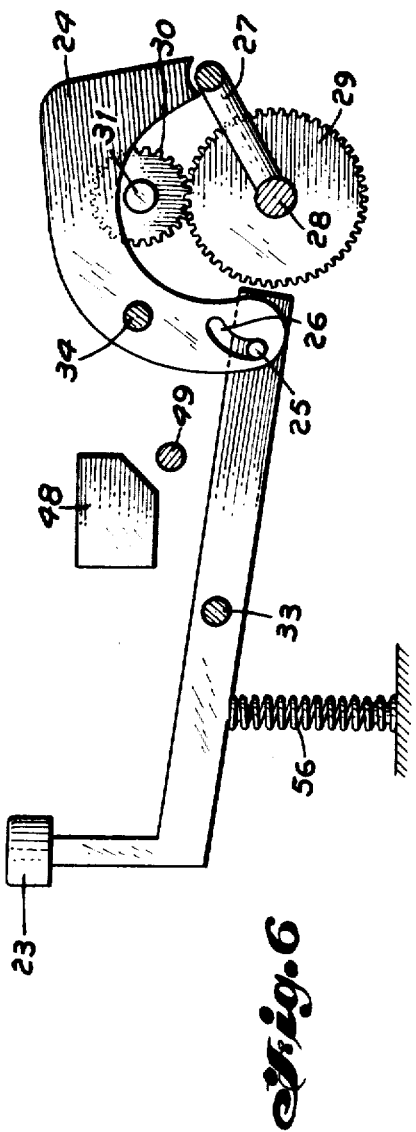

March 26, 1968   P. H. FOWLER ET AL   3,375,500
AUTOMATED ACCOUNTING SYSTEM
Filed Aug. 24, 1964   5 Sheets-Sheet 4

INVENTORS.
PETER H. FOWLER
WILLIAM S. LITCHMAN

Robert L. Crooke
ATTORNEY

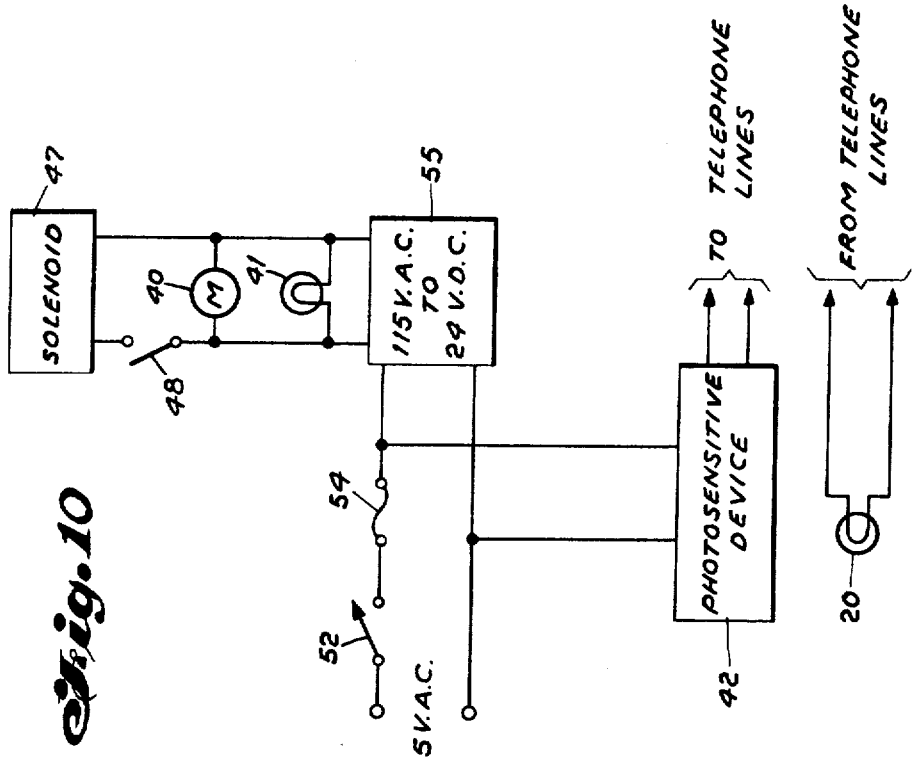
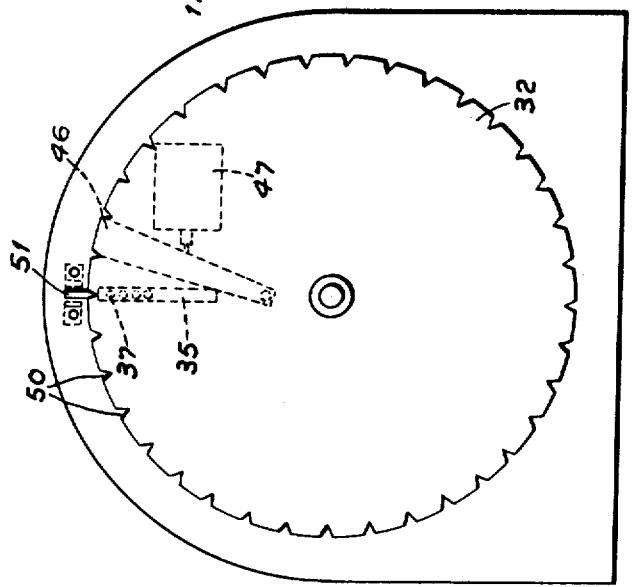

United States Patent Office 3,375,500
Patented Mar. 26, 1968

3,375,500
AUTOMATED ACCOUNTING SYSTEM
Peter H. Fowler, Midland Park, N.J., and William S. Litchman, New York, N.Y., assignors to International Telephone and Telegraph Corporation, Nutley, N.J., a corporation of Maryland
Filed Aug. 24, 1964, Ser. No. 391,494
17 Claims. (Cl. 340—172.5)

ABSTRACT OF THE DISCLOSURE

An automated data handling system having a centralized storage and computation center has at least one primary remote terminal point having means for transmitting to said storage and computation center information in the form of "tone" signals and means for registering said information in said storage and computation centers at selected times.

---

This invention relates to automated accounting systems, and, more particularly, to an automated accounting system involving the flow of information from a multiplicity of remote sites to a centralized computer.

Large economic systems often include the flow of information from a multiplicity of remote sites to a centralized locale; this centralized locale often being the situs of a computer. Usually, information at the remote sites is maintained manually, and furthermore, manually transported to the central locale, where insertion into the computer is to be effected.

Such economic systems are often encountered in banking. Most banks or bank complexes are equipped with centralized automatic equipment to record the daily, weekly or monthly status of all accounts, as well as for other purposes. Local branch offices usually update accounts on a manual basis, and when information is required from the central computer, long delays are usually involved.

The large department store exemplifies an enterprise wherein the various economic and accounting functions very often are performed manually. For example, the ordinary retail charge sale can involve performance of the following steps: a sales clerk writing up the sale; checking the credit status of the buyer with the credit department, frequently over a telephone in a private communication system; and finally sending the sales slip to the credit office where the purchase is to be entered against the buyer's account. At the end of the month or other billing period, the credit office totals the purchases and bills he customers. Each buyer or customer must write a draft on his bank to pay his bill. The bank receiving the draft from the store must present the draft to the customer's bank for payment, often through other banks and clearing house. This is a time-consuming and costly procedure, open to areas wherein errors are readily made.

Accordingly, it is an object of this invention to provide a system for feeding information from a plurality of remote locations to one centralized computer.

Another object of this invention is to provide a system whereby business-transaction information such as sales, account credits, billing, etc. can be carried out in conjunction with a centralized computer.

An additional object of this invention is to provide a system wherein *instantaneous* check-credit references can be made.

Still another object of this ivention is to make efficient use of a central computer by storing data during normally busy daytime hours and operating the computer itself during the night when the computer otherwise would not be in use.

A further object of this invention is to provide terminal devices for remote access to a central computer.

A still further object of this invention is to provide terminal devices, operable by persons of ordinary skill, for inserting business-transaction information, such as sales-account credits, etc., into a computer.

It is also an object of this invention to provide terminal devices for sending information over ordinary telephone lines to a remote computer.

A primary object of this invention is to provide terminal devices for sending intelligence over telephone lines a remote computer, where the intelligence assumes the form of a plurality of "tone" signals.

Yet another object of this invention is to provide terminal devices for sending information over telephone lines, the information comprising a code made up of "tone" signals using the eight frequencies selected by the Bell Telephone System as being optimum for their lines.

In achieving the foregoing objects, the present invention provides a plurality of terminal devices to send information over telephone lines to a remotely located computer. The computer subsequently stores the information and at some future time converts the information into a form, such as a punch card, which can be sent elsewhere for further action (such as a monthly billing statement to a customer). In turn, the punch card or alternative medium can be returned to the computer for appropriate action.

A feature of this invention is the remote-access terminal devices which are used for converting intelligence into a code transmittable over ordinary telephone lines. The elements of the code comprise a plurality of "tones" generated by a light source radiating through a generator disc onto a photosensitive device, the generator disc being continuously spun by a synchronous motor. A coaxial code disc is properly interposed between the light source and the photosensitive device, and has holes therein for admitting light at selected positions. The code disc is positioned by means of a conventional mechanical keyboard or other positioning means. Means can also be included to receive answers in form of "go, no-go" signals from the computer, in response to queries posed to the computer.

The above-mentioned and other features and objects of this invention will become more apparent by reference to the following description taken in conjunction with the accompanying drawings, in which:

FIGURE 1 is a block diagram illustrating a specific application of the disclosed system;

FIGURE 2 is a plan view showing a typical punch card employed in the system of FIGURE 1;

FIGURE 3 is a plan view of a primary terminal device;

FIGURE 4 is a partial section of the gearing arrangement of the primary terminal device as shown in FIGURE 3;

FIGURE 5 is partial section illustrating the spring loading of the switch bar, also shown in FIGURE 3;

FIGURE 6 is a sectional view in elevation illustrating the operation of the key lever and key arm of the apparatus of FIGURE 3;

FIGURE 9 is an elevation view illustrating a shutter arrangement employed in conjunction with the code disc of FIGURE 7; and FIGURE 10 is a schematic diagram illustrating the electrical wiring of the primary terminal device of FIGURE 3.

Figure 7:
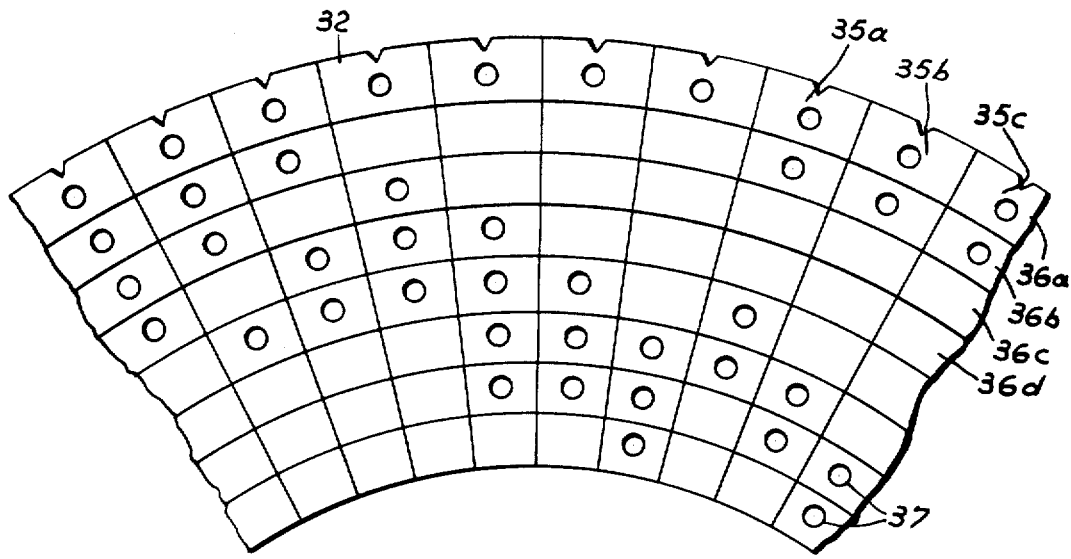
FIGURE 7 is a partial elevation view of a representative code disc.

FIGURE 1 illustrates a practical embodiment employing the inventive system, comprising a primary terminal device 10 located at a primary remote station 11, e.g. a store or branch office of a bank, the output of which is coupled by way of regular telephone lines 12 to the memory 13 of a computer 14, located at a central storage and information center 15, which, e.g. could be the principal office of a bank.

A typical retail credit sale could include the following transactions: a sales clerk would punch onto the keyboard of the primary terminal device 10 information such as the customer's account number, the identification number of the item purchased and the cost of the item. This information would be automatically transmitted over the regular telephone lines to be stored in the memory 13 of a central computer 14. The computer could be located at a bank, which would at present have such a large computer. Minor modifications to the computer would probably be necessary to give the primary terminal device 10 access to it.

At the end of the month or other billing period, the computer 14 would, on instruction, total all the purchases of each customer and print out an invoice. One embodiment of an invoice could take the form of a punch card 16 as shown in FIGURE 2. This punch card 16 could have thereon a place for the customer to put his signature 17, acknowledging the invoice. In this manner, he could be converting the invoice into a bank draft. Since not all customers would necessarily have their checking accounts at the same bank, and also in order to permit the check to be processed automatically, each customer would have a secondary terminal device 18 at his disposal. This device would allow the customer to punch the order to his bank and his signature in "machine language" so that, upon return of the punch card 16, to the bank 15, the punch card 16 could be inserted into the computer 14 for processing, which might include presentment through a clearing house and the customer's bank 19.

This system automates a procedure which, at present, is characterized by a multiude of costly manual operations. The cost of implementing the system is relatively small. Primary terminal devices 10 are designed to be simple in construction, fully compatible with the existing telephone system, and capable of use by unskilled personnel. The costly component in the system is the computer; however, as mentioned in the example above, tying into an existing computer system limits costs in this area to those of the access apparatus. No additional computer is necessary since during normal working hours all information is stored in a memory; and only at night, when the computer is often on "down time," is access made to the computer proper. In effect this makes more efficient use of an existing system and therefore is beneficial not only to the primary terminal enterprises, but also to the bank which realizes better efficiency in the use of its computer system.

The secondary terminal device 18 can be made at a very low cost. A simple chassis containing a series of punches with a lock attached, for preventing unauthorized use, suffices, for this purpose.

In addition to handling retail credit sales, the system can also be used to keep a running inventory for the primary terminal enterprise. If daylight-hour use of the computer 14 is practical, queries such as the credit standing of customers can be posed, with the computer returning an instantaneous answer in the form of a "go, no-go" signal, e.g. the flashing of a light 20 situated on the primary terminal device 10.

FIGURE 3 illustrates one embodiment of the primary terminal device 10, comprising a case 21 having therein a keyboard 22 made up of a plurality of key levers 23.

A typical key lever 23 is shown in FIGURE 6. A key arm 24 is loosely coupled to key lever 23 by a pin 25 which rides in slot 26 located in key arm 24.

The respective key arms 24 operate a code disc bar 27 which in turn rotates a code disc shaft 28. Gear 29 secured to code disc shaft 28 is meshed with a gear 30 which is secured to shaft 31. A code disc 32 is also secured to shaft 31.

Key arms 24 are of various lengths in order to rotate code disc bar 27 different amounts for each distinct character being transmitted.

The key lever 23 pivots about bar 33, and the key arm 24 about bar 34; bars 33 and 34 are rigidly attached to case 21.

A portion of a representative code disc 32 is shown in FIGURE 7. The disc is divided into radial segments 35a 35b, 35c, etc.; one radial segment represents each character which is to be transmitted, the desired radial segment being selected by pressing the respective key lever 23. Each radial segment is divided into an equal number of opaque blocks 36a, 36b, 36c, 36d, etc.; with holes 37 formed in some of the blocks in accordance with the characteristics of the code.

The code disc 32 has V-cuts 50 along its periphery at the center of each radial segment 35 for maintaining the code disc in correct alignment for precise transmission. The disc is maintained in the desired position by a pin 51, which slips into the respective V-cut and holds the disc until a different key lever is struck.

Figure 8:
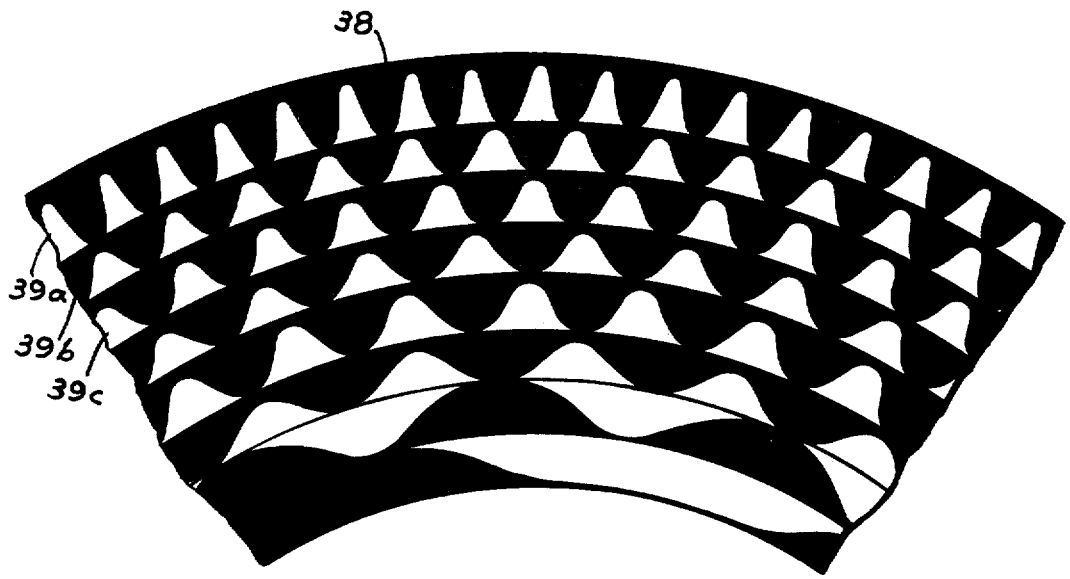
FIGURE 8 is a partial elevation view of a symbolic generator disc.

FIGURE 8 illustrates a portion of a typical code-element generator disc 38. Each coaxial segment 39a, 39b, 39c, etc. is made up of alternate opaque and translucent "humps" and produces different "tones" when the generator disc 38 is rotated by a synchronous motor 40 and a light source 41 is permitted to radiate on and through any one coaxial segment 39 onto a photosensitive device 42. The coupling between synchronous motor 40 and generator disc 38 is shown in FIGURE 4. The shaft of synchronous motor 40 is coupled to gear 43 which meshes with gear 44, secured to shaft 45. Generator disc 38 is also secured to shaft 45.

A shutter 46 prevents light from reaching photosensitive device 42 until a key lever 23 is depressed, as shown in FIGURE 9. Shutter 46 is secured to a solenoid 47 which functions in conjunction with a switch 48. Switch 48 is actuated by switch bar 49 as shown in FIGURE 6. On depression of key lever 23, switch bar 49 is raised, closing switch 48 which activates solenoid 47, shifting shutter 46 away from the light path and thereby permitting the selected code signals to be transmitted. When the key lever 23 is released, switch bar 49, being spring loaded by spring 53 (see FIGURE 5), opens switch 48 causing solenoid 47 to drop out, closing shutter 46, and hence cutting off the light path through code disc 32.

A switch 52 is provided for turning on and off input power. FIGURE 10 illustrates the electrical wiring of the primary terminal device 10. The voltage values shown are representative only and are not intended to be interpreted as limitations. Power is applied to the primary terminal device 10 through switch 52 and a fuse 54. This input power is supplied to the photosensitive device 42 and also is converted to a lower DC voltage for energizing light source 41, synchronous motor 40, and (via switch 48) solenoid 47. The output from the photosensitive device 42 is coupled to ordinary telephone lines for transmission to computer 14. Lamp 20 is wired to receive input signals from computer 14, also over the normal telephone channels.

The sequential operation of one embodiment of primary terminal device 10 is as follows:

Switch 52 is turned on, supplying power to light source 41 and synchronous motor 40. Gear 43 secured to the shaft of synchronous motor 40 rotates gear 44 meshed therewith, which in turn rotates shaft 45; generator disc 38 also is rigidly attached to shaft 45 and hence is also rotated.

The key lever 23 associated with the character to be transmitted is struck, causing key arm 24 to pivot about bar 34, revolving code disc bar 27. Code disc bar 27 rotates code disc shaft 28. Gear 29, affixed to shaft 28, rotates, in turn rotating gear 30, meshed with gear 29. Gear 30, being secured to shaft 31, causes the latter to rotate which in turn rotates code disc 32, also attached to shaft 31, positioning code disc 32 in place to transmit the code corresponding to the character selected by pressing key lever 23. Pin 21 sitting in V-cut 50 aligns the code disc properly until a different key lever is struck.

The striking of key lever 23, in addition to positioning code disc 32, as mentioned above, causes switch 39 to be raised against the action of spring 53, actuating switch 48. Swith 48 subsequently causes solenoid 47 to pull in, opening shutter 46 and opening a path for light from light source 41 through the holes 37 in one radial segment 35, and through the respective rotating coaxial elements 39 onto photosensitive device 42. Electrical signals from photosensitive device 42 are then transmitted over telephone lines coupled thereto.

When a key lever 23 is released, it is returned to its normal position by compression spring 56. Switch 48 is opened and, therefore, shutter 46 is closed, blocking the aforementioned light path and causing transmission of information to cease. The code disc shaft 28 is returned ready for the next operation by a suitable spring mechanism not shown in the diagram.

While we have described above the principles of our invention in connection with specific apparatus, it is to be clearly understood that the specification is presented by way of example and not as a limitation of the scope of our invention, as set forth in the accompanying claims.

We claim:

1. An automated data-handling system comprising a centralized storage and computation center, at least one primary remote terminal point, each said primary remote terminal point having means for transmitting to said storage and computation center information in the form of "tone" signals, and means for registering said information in said storage and computation center at selected times.

2. An automated data-handling system as in claim 1, further including at least one secondary remote terminal point, said storage and computation center including means for recording said information on punch cards whereby the punch cards are forwarded to said secondary remote terminal point for acknowledgment.

3. An automated data-handling system as in claim 1 wherein said means for transmitting coded "tone" signals includes telephone system lines.

4. An automated data-handling system as in claim 1 wherein said primary remote terminal points further include means for receiving information from said storage and computation center in response to queries posed to said storage and computation center.

5. An automated data-handling system as in claim 4 wherein said received information is in the form of a go, no-go signal.

6. In an automated data-handling system for transmitting information over telephone lines, a transmitter comprising means for selecting the characters comprising the intelligence to be transmitted, and means for converting each of said characters into a plurality of signals optimized for transmission over ordinary telephone lines.

7. In an automated data-handling system for transmitting information over telephone lines, a transmitter comprising means for selecting each of the characters comprising the information to be transmitted, and means for representing each of said selected characters by a plurality of coherent electrical undulations.

8. In an automated data-handling system for transmitting information over telephone lines, a transmitter comprising means for selecting the characters comprising the information to be transmitted, and coding means for representing each of said selected characters by at least one of a plurality of predetermined electrical undulations, particular combinations of undulations being chosen to represent each selected character.

9. The combination according to claim 8 in which said coding means includes a code disc, a generator disc, a synchronous motor for rotating said generator disc, a light source and a photosensitive device said light source being arranged for radiating through said generator disc onto said photosensitive device to produce said plurality of undulations, said selected undulations being chosen by the positioning of said code disc between said light source and said photosensitive device.

10. The combination according to claim 9 in which said character-selecting means includes a keyboard.

11. In an automated data-handling system for transmitting information over telephone lines, a transmitter comprising a keyboard having a plurality of keys each having a symbol thereon corresponding to the respective characters to be transmitted, and means responsive to the manual striking of each of said keys causing at least one of a plurality of signals to be generated, said signals being a plurality of oscillations selected for optimum transmission over telephone lines.

12. Telephone transmission apparatus comprising means for selecting at least one of a plurality of characters for transmission over telephone system lines and means for generating at least one of a plurality of predetermined electrical undulations to represent said selected character.

13. Telephone transmission apparatus as in claim 12 wherein said selection means includes a plurality of keys, each of said keys having an arm attached thereto, said arm when activated operating a bar which is coupled to said generating means.

14. Telephone transmission apparatus comprising:
 (a) a keyboard having a plurality of key levers for selecting the character to be transmitted;
 (b) a code disc operated by said key levers;
 (c) a generator disc adjacent said code disc;
 (d) a synchronous motor continually rotating said generator disc;
 (e) a light source adjacent one side of said discs;
 (f) a photosensitive device adjacent the other side of said discs;
 (g) switching means operated by said key lever;
 (h) a solenoid operated by said switching means; and
 (i) a shutter adjacent said code disc and operated by said solenoid; whereby the actuation of said key lever rotates said code disc to a position corresponding to the character to be transmitted, concurrently operating said shutter to open a light path from said light source through said code and generator discs to said photosensitive element, to cause said photosensitive element to emit electrical signals in accordance with the character selected.

15. Apparatus as in claim 14 wherein each of said key levers includes a key arm arranged at one end thereof, each such key arm having a length peculiar to the character represented thereby.

16. Apparatus as in claim 15 and further including a code bar coupled to said code disc whereby the depression of said key lever causes said arm to actuate said code bar and in turn position said code disc.

17. Means for generating coherent oscillations comprising a light source, a photosensitive device a code disc and a pattern disc having thereon a series of different coaxial patterns, each of said patterns comprising opaque and transparent sections whereby, when said disc is revolved at a constant speed and light from said light source is caused to radiate upon one or more of said coaxial patterns, through said code disc, said light passes through each of said patterns to cause a different coherent undulation to be produced.

References Cited

UNITED STATES PATENTS

| | | | |
|---|---|---|---|
| 2,193,875 | 3/1940 | Lindenblad | 178—7.1 |
| 2,408,754 | 10/1946 | Bush | 178—79 |
| 2,439,392 | 4/1948 | Jones | 250—233 |
| 3,225,334 | 12/1965 | Fields | 340—172.5 |

ROBERT C. BAILEY, *Primary Examiner.*

R. ZACHE, *Assistant Examiner.*